United States Patent [19]

Kuhn

[11] Patent Number: 4,747,612
[45] Date of Patent: May 31, 1988

[54] QUICK ATTACH COUPLING

[75] Inventor: John B. Kuhn, Mayville, Wis.

[73] Assignee: Deere & Company, Moline, Ill.

[21] Appl. No.: 844,047

[22] Filed: Mar. 26, 1986

[51] Int. Cl.⁴ ............................................. A01B 59/00
[52] U.S. Cl. ................................ 280/460 A; 172/275;
280/477; 280/507; 280/508; 292/207
[58] Field of Search .......... 280/434, 436, 437, 456 A,
280/460 R, 460 A, 461 A, 477, 507, 508, 510;
172/272, 273, 274, 275; 292/207, 216, 60;
37/231

[56] References Cited

U.S. PATENT DOCUMENTS

| | | | |
|---|---|---|---|
| 1,337,391 | 4/1920 | Cooper | 280/509 |
| 1,592,832 | 7/1926 | Londe | 280/434 |
| 2,050,518 | 8/1936 | Baumgardner | 280/492 |
| 2,120,637 | 6/1938 | Van Doorne | 254/328 |
| 2,403,973 | 7/1946 | George et al. | 280/490 R |
| 2,838,326 | 6/1958 | Georgi | 280/434 |
| 2,904,348 | 9/1959 | Quastad | 280/508 X |
| 3,171,673 | 3/1965 | Webber | 280/477 |
| 3,282,607 | 11/1966 | Steinway | 280/434 |
| 3,298,724 | 1/1967 | Coleman et al. | 403/314 |
| 3,347,564 | 10/1967 | Snoozy | 280/479 R |
| 3,398,587 | 8/1968 | Martin | 74/15.63 |
| 3,420,551 | 1/1969 | McMillan II | 280/509 |
| 3,731,745 | 5/1973 | Koch | 280/461 A X |
| 3,856,331 | 12/1974 | Bogdanovich | 280/479 R |
| 3,987,562 | 10/1976 | Deen et al. | 172/275 X |
| 4,073,517 | 2/1978 | Bills | 292/60 |
| 4,158,996 | 6/1979 | Marulic | 292/207 X |

FOREIGN PATENT DOCUMENTS 884460  7/1953  Fed. Rep. of Germany ...... 280/437

Primary Examiner—John J. Love
Assistant Examiner—Charles R. Watts

[57] ABSTRACT

An improved coupler or hitch assembly of the latch plate type. Angled jaws on the coupler act together with ramps or angled arms on the equipment secured by the coupler to forgive vertical or horizontal misalignment during the coupling operation. The assembly has an automatically engaging latch plate which is held in a closed position by a lock pin. The lock pin also provides frictional restraint for holding the plate in an open position. A lock pin holding mechanism allows relatively unresisted movement of the latch plate from an open to a closed position. Movement of the latch plate is also controlled by a limit tab on the coupler to prevent the lock pin from interfering with the coupler operation.

11 Claims, 2 Drawing Sheets

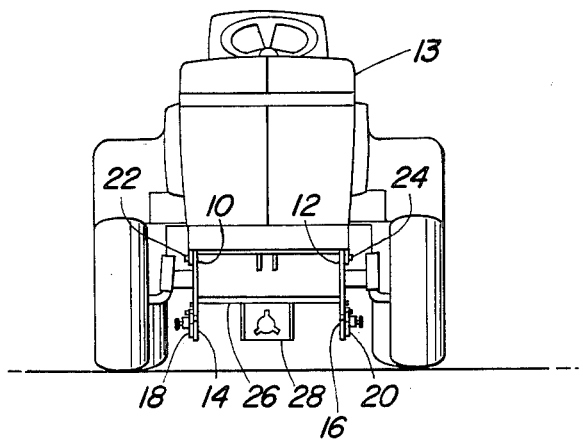
FIG. 1
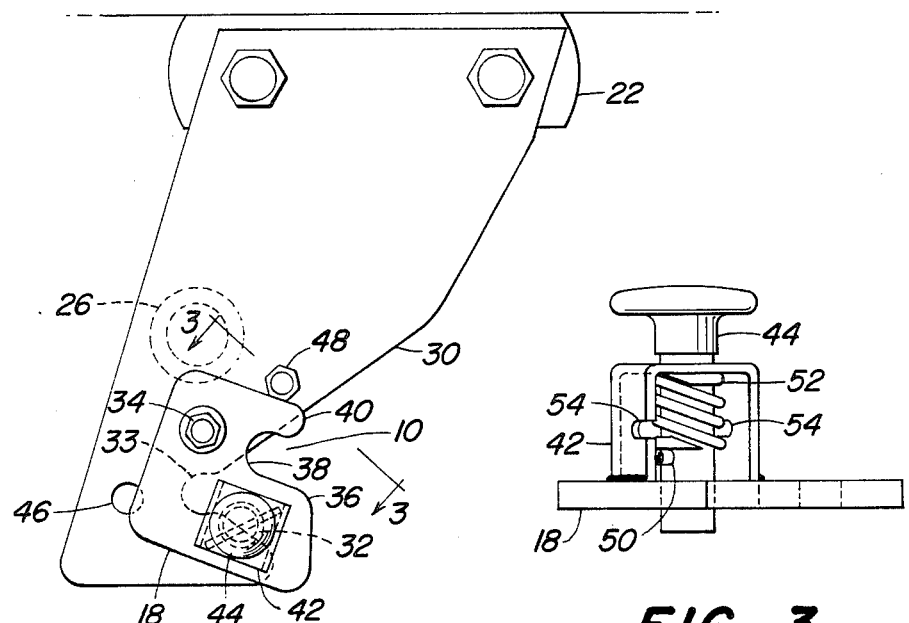
FIG. 2
FIG. 3

QUICK ATTACH COUPLING

BACKGROUND OF THE INVENTION

1. Field of the Invention

This invention relates generally to a coupling arrangement for attaching equipment to a vehicle. More particularly, this invention relates to a plural coupler for attaching equipment to the front of a tractor.

2. Description of the Prior Art

Vehicles including tractors and industrial equipment have available a variety of equipment that can be coupled thereto. Coupling equipment to the vehicle requires horizontal and vertical alignment of the coupler elements on the equipment and vehicle. The equipment to be coupled is often heavy, in excess of several hundred pounds, and very difficult for a lone operator to align and couple to the vehicle. In addition, the coupler itself should operate simply and preferably automatically to couple the equipment to the vehicle as the vehicle and the equipment are brought together Thus, the problem becomes one of coupling equipment to the vehicle quickly, easily and economically.

A variety of coupling mechanisms have been shown in the prior art for attaching equipment to a vehicle via a stud and a stud engaging slot. One common type has a set of jaws with a coupler plate that traps a stud in the jaw as the vehicle and equipment are brought together thereby pushing the stud into the jaws. These devices typically use a spring loaded latch plate that is acted upon by the stud and must be pivoted into a locking position by overcoming the force of the spring. When a coupling mechanism is needed to attach equipment to the front of a vehicle, it is convenient to leave the latch mechanism in a closed position when equipment is not coupled to the front of the vehicle in order to prevent the latch mechanism from grabbing debris and objects that the vehicle may encounter. This is particularly true for coupling mechanisms that are located close to the ground. Or it may be desirable to move the latch plate to a closed position to simply prevent chattering and wear of the coupling components when the vehicle is operated without the equipment attached. Pivotal resistance caused by the spring force is disasdvantageous, in that it makes it difficult for the operator to close the latch plate manually without coupling the implement and requires the exercise of care in releasing the latch plate. However some method such as the spring is needed to keep the latch plate from blocking the jaws during a coupling operation.

The spring loading of a latch plate presents a further disadvantage when a lock pin is used to hold the plate in a closed position. In such an arrangement, the spring force biasing the latch plate to an open position exerts a force on the lock pin which may make the pin difficult to remove prior to uncoupling the equipment.

To further facilitate the coupling operation, the jaws in the latch type coupler mechanism will have a V shape to forgive misalignment of the stud in one direction as the jaws receive the stud. However the jaw arrangement still requires the operator to provide fairly precise alignment between the mating coupler elements in a direction perpendicular to the plane of the jaw opening. In tongue type coupler mechanisms it is known from U.S. Pat. No. 2,120,637 to use a cone shaped opening to receive the tongue which will forgive misalignment in multiple directions. However such an arrangement adds expense, restricts access around the couplers, and is not well suited to a stud type attachment which may be secured to a pivotable arm.

Accordingly, it is an object this invention to provide a coupler that may be restrained in an open position without the drawbacks of the prior art coupling mechanisms.

More specifically, it is an object of this invention to provide a latch plate coupling mechanism that does not use a spring to restrain the latch to an open position.

It is a further object of this invention to provide a latch plate coupling mechanism that is easily moved by hand to an open or closed position.

A yet further object of this invention to provide a coupling mechanism that can be automatically activated by relative movement between the vehicle and equipment.

Another object of this invention is to provide a coupler arrangement that will forgive bi-directional misalignment during the coupling process.

SUMMARY OF THE INVENTION

In a broad embodiment, this invention is directed to a coupler for receiving and retaining a stud. The coupler includes a pair of fixed jaws defining an inwardly converging notch that receives the stud. A latch plate is pivotally mounted along side the notch and has a cam surface which is acted upon by the stud when it enters the notch to pivot the latch plate into a closed position. When the latch plate is in a closed position, a prong projecting therefrom traps the stud in the notch. In order to hold the latch plate in a locked position, a lock member is slidably supported with respect to said jaws and plate. The lock member is resiliently biased to automatically engage a stop to prevent rotation of the plate out of the closed position. The lock member can also contact the jaws or the latch plate to provide frictional resistance to relative rotation between the plate and jaws. In addition means are provided for holding the lock member out of engagement with the stop and from frictionally resisting relative rotation of the plate and bracket.

In a more limited embodiment, this invention is directed to a plural coupling for receiving and retaining a pair of spaced apart studs wherein the coupler includes a pair of spaced apart brackets that are vertically depending from a vehicle, each bracket having a vertically elongated and inwardly converging notch that opens in a common direction with the other notch. A latch plate is pivotally mounted on each bracket. Each plate has a cam surface and a projecting prong that acts in the manner hereinbefore described. A lock pin that serves as the lock member is inboardly biased, with respect to the space between the brackets, and again automatically engages a stop to hold the latch plate in a closed position and can provide frictional resistance to relative rotation between the plate and bracket. Means are included for holding each pin in an outboard position out of engagement with its stop and out of frictional contact with either the plate or the bracket.

In a yet more limited embodiment, the plural coupling has a pair of ramp surfaces operable in a direction perpendicular to the notch profiles which act in conjunction with the notches to forgive misalignment of equipment in two directions as it is received by the coupling.

Other objects, embodiments and details of this invention are set forth in the following detailed description of the invention.

BRIEF DESCRIPTION OF THE DRAWINGS

FIG. 1 is a front view of a tractor having the coupling of this invention mounted thereon.

FIG. 2 is an enlarged side view of a single coupling mechanism taken from FIG. 1.

FIG. 3 is a view of a portion of the mechanism of FIG. 2.

DESCRIPTION OF THE PREFERRED EMBODIMENT

Figure 4:
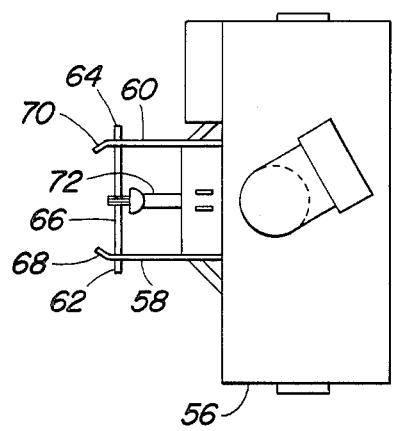
FIG. 4 shows a top view of a snowblower which is attached to the tractor of FIG. 1 via the coupling assembly.

Looking then at FIG. 1, the coupler mechanism consists of a pair of spaced apart brackets 10, 12 that depend vertically from the front of a tractor 13 and a pair of forward opening notches 14, 16 cut out of brackets 10 and 12, respectively. These notches extend to about the bottom of the brackets and are therefore located near the ground level of the tractor. Each bracket 10, 12 has a latch plate 18, 20 located to its outboard side. The brackets 10, 12 are bolted to weldments 22, 24 on the tractor frame and laterally braced across the space between the brackets by a strut 26 having a drive coupling assembly 28 attached thereto.

FIG. 2 shows latch plate 18 notch 14 and bracket 10 in more detail and represents a reverse image of bracket 12 and plate 20. Notch 14 has an upper jaw 30 and a lower jaw 32 for receiving a hereinafter shown stud over a range of vertical positions. A bracket slot 33 joins the jaw surfaces at their converging ends. Latch plate 18 is rotatably mounted to the bracket 10 by a bolt and stud 34. The latch plate is shown in an open or stud receiving position with cam surface 36 partially blocking the mouth of the notch 14. A latch slot 38 separates cam surface 36 from a projecting prong 40. The bracket and latch plate slots have a radius only slightly larger than the radius of the stud to be received therein so that the stud does not have excessive play in the slot and movement between the tractor and the equipment attached by the coupler is minimized. Ends of a U-channel 42 are welded to the outer surface of latch plate 18. A headed lock pin 44 extends through holes in plate 18 and the bottom of U-channel 42. The U-channel and plate 18 guide pin 44 for axial movement perpendicular to the rotational plane of the latch plate. Latch plate 18 can be pivoted from the position shown in FIG. 1 to a closed position wherein pin 44 can engage a hole 46 and the openings of bracket slot 33 and plate slot 38 are at right angles such that prong 40 blocks the opening of slot 33. A limit tab comprising a self tapping bolt 48 restricts latch plate 18 to pivotal movement and prevents plate 18 from assuming a position wherein pin 44 could extend into the notch.

In order to urge the lock pin against the bracket or through an opening therein it is acted upon by a cross pin 50 and a spring 52 as shown in FIG. 3. Cross pin 50 passes perpendicularly through lock pin 44. Spring 52 acts against cross pin 50 and the bottom of U bracket 42 to urge the lock pin into or through bracket 10. Cross pin 50 can be positioned in a pair of slots 54 by pulling lock pin 44 in an outboard direction, compressing spring 50, and turning the lock pin clockwise. When the cross pin is in the slots 54, the lock pin 44 cannot contact bracket 18.

A snowblower for attachment to the tractor via the coupling of FIG. 1 is shown in FIG. 4. The snowblower is supported from the coupler by a pair of arms 58, 60 extending from the back of snowblower. A pair of studs 62, 64 project out of the outboard sides of the arms and are received by the notches of the coupler mechanism. These studs are oriented perpendicular to the arms and are part of a stay bar 66 that maintains the spacing between the arms. Each arm has an angled end portion 68, 70 extending past the studs and converging in a direction generally opposite the snowblower. The outer side of these angled portions will contact an inner side of one of the brackets whenever the snowblower is horizontally misaligned during the coupling process. Contact between the bracket and angled portion of the arm will correct horizontal misalignment of the snowblower as its studs move through the jaws and into the slots at the end of the notches. FIG. 4 also shows a drive linkage 72 for the snowblower projecting out its back.

Figure 5:
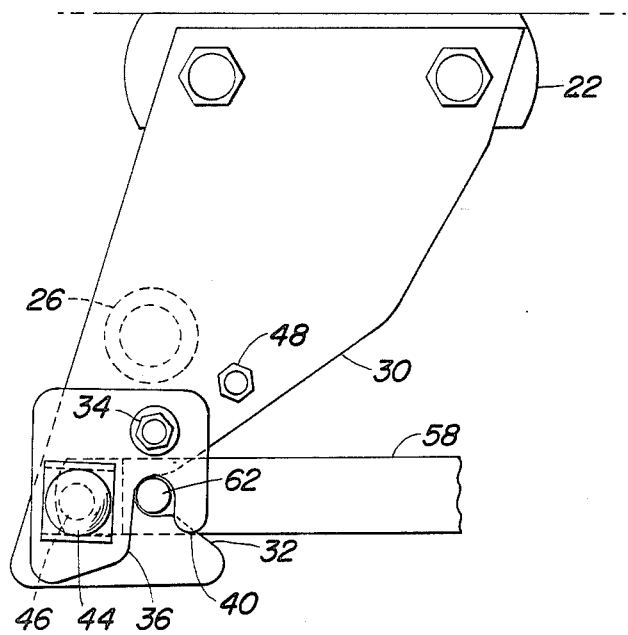
FIG. 5 shows a side view of the coupling assembly with an arm of the snowblower attached thereto.

When the snowblower is coupled to the tractor, arms 58 & 60 extend into the space between brackets 18 and 20 and the latch plate is in a closed position with the bracket and plate slots surrounding stud 62 as shown in FIG. 5.

OPERATION

The simplicity and convenience of this coupling arrangement can be more fully appreciated in the context of loading and unloading. Action of the latch plates will only be described for one side of the coupling mechanism during the loading and unloading operation since both sides operate in essentially the same manner. The loading operation begins with the tractor in front of the snowblower and the snowblower supported on the ground. In its ground supported condition, the studs have an elevation within the vertical opening defined by jaws 30 and 32. The front and back of the tractor and snowblower, respectively, are in a direct line to within the tolerance permitted by the angled portion of the snowblower attachment arms. At this time the latch plate is in an open position, as shown in FIG. 2, with the inboard end of the lock pin acting against bracket 10 in frictional engagement therewith. Frictional force of the pin against the bracket allows the latch plate to be positioned and held in a fully open position with respect to the notch opening. At this stage bolt 48 prevents the latch plate from being rotated, either by the operator or contact with the stud, into a position wherein the lock pin would engage the jaw and block the notch opening.

As the tractor is driven forward, the brackets meet the ends of the snowblower arms and studs. Vertical misalignment is corrected by the notch jaws and horizontal misalignment is corrected by the ramp portions of the arms as forward movement of the tractor continues. Forward movement also causes the latch plate 18, as viewed in FIG. 2, to pivot clockwise. Continued forward motion finally moves stud 62 all the way back into the bracket slot and latch plate 18 is pivoted so that the latch plate slot and bracket slot are at right angles to surround stud 62 as shown in FIG. 4. When the slots line up at right angles, lock pin 44 is automatically urged by spring 52 into hole 46. The operator then completes the equipment hookup by attaching the drive link 72 to the drive coupling 28 and the snowblower body to a lift mechanism (not shown) for raising or lowering the snowblower relative to the tractor.

In order to decouple the snowblower from the tractor the operator drives the tractor forward to push the stud against the back of the bracket slot 33. This relieves pressure on the latch plate which could tend to bind the lock pin and make it difficult to remove the lock pin from hole 46. The operator then pulls lock pin 44 in an outboard direction and turns it clockwise to engage the cross pin in the bracket slot. After detaching the drive coupling and lift mechanism the operator drives the tractor backward to complete the decoupling operation by withdrawing the stud from the notches as the latch plate 18 is rotated counterclockwise.

Once the equipment is withdrawn the operator may simply leave the latch mechanism and the latch plate free to pivot about the bolt. Or preferably, the latch plate 18 will be rotated clockwise and the lock pin put in engagement with hole 46 to hold the latch plate in a closed position or latch plate 18 will be rotated counterclockwise and lock pin 44 put in frictional engagement with the bracket to hold the latch plate in an open position for another coupling operation.

While this invention has been described in the context of a specific embodiment this presentation is not meant to limit the invention to the specific details disclosed herein.

I claim:

1. A coupler, operatively connected to a vehicle, for operatively connecting an implement, having a stud, to said vehicle, said coupler comprising:
    a pair of fixed jaws, operatively connected to said vehicle, defining an inwardly converging notch for receiving said stud;
    a latch plate pivotally mounted on said pairs along side said notch and being capable of relatively unrestrained pivotal movement with respect to said jaws, said plate having a cam surface upon which said stud acts when urged into the notch and a prong projecting therefrom, action of said stud against the cam surface pivoting said plate to a closed positon wherein the prong traps said stud in the notch;
    a resilient lock means mounted on said latch plate and slidably supported with respect to said jaws and said plate, for frictionally resisting relative rotation between said plate and said jaws and for automatically engaging a stop means, said stop means being formed in said jaws proximate said notch for preventing rotation of said plate out of said closed position; and
    means for holding said lock means out of engagement with said stop means and preventing said lock means from frictionally inducing resistance to rotation of said plate relative to said jaws.

2. The coupler of claim 1 wherein said lock means further comprises:
    a U-channel operatively connected to said plate;
    a lock pin extending through said plate and said U-channel;
    a cross pin positioned perpendicular to said lock pin; and
    a spring, operatively positioned on said lock pin, for urging said lock pin into said bracket.

3. The coupler of claim 1 further comprising means for preventing said latch plate from engaging said notch.

4. A plural coupling, operatively connected to a vehicle, for operatively connecting an implement having a pair of spaced apart attachment studs, said coupling comprising:
    a pair of spaced apart and vertically depending brackets operatively connected to said vehicle, each bracket defining a vertically elongated and inwardly converging notch, each notch opening in a common direction;
    a latch plate, pivotally mounted on each bracket, having a cam surface upon which said stud acts when urged into said notch and a prong projecting therefrom such that upon contact of said stud against said cam surface said plate is pivoted to a closed position wherein said prong traps said stud in said notch;
    a lock pin means mounted on said latch plate, cooperating with each bracket and plate, and slidably supported with respect to said bracket and plate to have at least a component of motion perpendicular to the pivotal plane of said plate, each means being inboardly biased, with respect to the space between said brackets, for automatically engaging a stop and for frictionally resisting relative rotation between its cooperating plate and bracket, said stop means being formed in said notch for preventing rotation of said plate out of said closed position; and
    means for holding each pin means in an outboard position out of engagement with its stop means thereby preventing said pin means from frictionally inducing resistance to relative rotation between its cooperating plate and bracket.

5. The coupling of claim 4 wherein said plate means is mounted outboard of said brackets and each pin means is mounted on its cooperating plate means to slide in a direction perpendicular to the pivotal plane of said plate means.

6. The coupling of claim 5 wherein each of said brackets has a limit tab blocking rotation of said plate means to a position allowing said pin means to engage the notches.

7. The coupling of claim 5 wherein each lock pin means has a radially extending cross pin and is supported by a bracket on said plate means, the bracket having a slot thereon for receiving the cross pin which is brought therein by pivoting the lock pin means about its axis so that the slot and the cross pin provide said holding means.

8. A plural coupling assembly, operatively connected to a vehicle, for attaching an implement to said vehicle, said coupling assembly comprising:
    a pair of spaced apart brackets vertically depending from said vehicle and defining a vertically elongated and inwardly converging notch opening in a common direction;
    a pair of studs fixed to said implement and located on a common center line;
    a coupler plate, pivotally mounted to the outboard side of each bracket along side said notch, having a cam surface upon which one of said stud acts when urged into said notch and a prong projecting therefrom, action of said stud against said cam surface causing said plate to pivot to a closed position wherein said prong traps said stud in said notch;
    a lock pin means mounted on each plate to slide axially in a direction perpendicular to the pivotal plate of said plate, and being inboardly biased for automatically engaging a stop on said bracket, said means being formed in said bracket proximate said notch for preventing rotation of said plate out of said closed position, and frictionally resist relative rotation between said plate and bracket;

means for holding each pin means in an outboard position, out of engagement with its corresponding bracket and stop means; and a pair of spaced apart arms, operatively connected to said studs, extending along converging axes in a direction generally opposite said implement, the spacing between each arm in the area of each stud approximating the inside dimension between said notches.

9. The coupling of claim 8 wherein each bracket has a limit tab to prevent pivotal movement of the plates into a position allowing said pin means to engage the notches.

10. The coupling of claim 8 wherein each lock pin means has a radially extending cross pin and is supported by a bracket on said plate, the bracket having a slot thereon for receiving the cross pin which is brought therein by pivoting the lock pin means about its axis so that the slot and the cross pin provide said holding means.

11. A coupler, operatively attached to a vehicle, for attaching implements, having a stud, to said vehicle, said coupler comprising:

a pair of spaced apart brackets, operatively connected to the front of said vehicle, each having an open notch and a stop proximate said notch formed therein;

at least one latch plate means having a cam surface and a prong, pivotally connected to each of said brackets for trapping said stud in said notch upon said stud being urged against said cam surface such that said at least one latch plate means is rotated clockwise relative to said notch and said stud is received in said notch; and resilient means, operatively connected to said at least one plate means, for frictionally resisting relative rotation between said at least one plate means plate and said bracket and for automatically engaging said stop when said at least one plate means is rotated by said stud such that said stud is positioned in said notch thereby locking said stud in said coupler and said implement to said vehicle.

* * * * *

UNITED STATES PATENT AND TRADEMARK OFFICE
CERTIFICATE OF CORRECTION

PATENT NO. : 4,747,612
DATED : 31 May 1988
INVENTOR(S) : John B. Kuhn

It is certified that error appears in the above-identified patent and that said Letters Patent is hereby corrected as shown below:

Column 5, line 36, delete "pairs" and insert -- jaws -- .

Signed and Sealed this

Eighteenth Day of July, 1989

*Attest:*

DONALD J. QUIGG

*Attesting Officer*

*Commissioner of Patents and Trademarks*